US008713098B1

(12) United States Patent
Adya et al.

(10) Patent No.: US 8,713,098 B1
(45) Date of Patent: Apr. 29, 2014

(54) METHOD AND SYSTEM FOR MIGRATING OBJECT UPDATE MESSAGES THROUGH SYNCHRONOUS DATA PROPAGATION

(75) Inventors: Atul Adya, Bellevue, WA (US); Gregory H. Cooper, Seattle, WA (US); Daniel Sumers Myers, Seattle, WA (US); Arunabha Ghosh, Redmond, WA (US)

(73) Assignee: Google Inc., Mountain View, CA (US)

( * ) Notice: Subject to any disclaimer, the term of this patent is extended or adjusted under 35 U.S.C. 154(b) by 166 days.

(21) Appl. No.: 13/251,000

(22) Filed: Sep. 30, 2011

Related U.S. Application Data

(60) Provisional application No. 61/389,160, filed on Oct. 1, 2010.

(51) Int. Cl.
*G06F 7/00* (2006.01)
*G06F 15/16* (2006.01)
*G06F 15/177* (2006.01)
*G06F 12/00* (2006.01)
*G06F 9/44* (2006.01)

(52) U.S. Cl.
USPC ........... 709/203; 707/610; 707/621; 707/769; 707/777; 707/784; 709/204; 709/206; 709/219; 709/220; 709/221; 709/230; 709/236; 711/135; 711/163; 711/166; 717/122; 717/168; 717/170; 717/171; 717/177

(58) Field of Classification Search
None
See application file for complete search history.

(56) References Cited

U.S. PATENT DOCUMENTS

| 5,421,009 | A | * | 5/1995 | Platt .............................. 709/221 |
| 5,734,898 | A | * | 3/1998 | He ....................................... 1/1 |
| 6,029,175 | A | | 2/2000 | Chow et al. |
| 6,052,735 | A | * | 4/2000 | Ulrich et al. ................... 709/236 |
| 6,289,510 | B1 | * | 9/2001 | Nakajima ...................... 717/170 |
| 6,317,754 | B1 | * | 11/2001 | Peng .............................. 707/610 |
| 6,738,812 | B1 | | 5/2004 | Hara et al. |
| 7,043,263 | B2 | * | 5/2006 | Kaplan et al. .................. 455/466 |
| 7,107,330 | B1 | * | 9/2006 | Hamilton et al. ............. 709/221 |
| 7,203,708 | B2 | * | 4/2007 | Liu et al. ................................ 1/1 |
| 7,243,163 | B1 | * | 7/2007 | Friend et al. ................... 709/248 |

(Continued)

OTHER PUBLICATIONS

Kulkarni, Information Access in Mobile Computing Environments, U. of Notre Dame, Technical Report 93-11, Oct. 1993, 17 pgs.

*Primary Examiner* — Ario Etienne
*Assistant Examiner* — Ho Shiu
(74) *Attorney, Agent, or Firm* — Morgan, Lewis & Bockius LLP

(57) ABSTRACT

A computer-implemented method in a distributed network system is disclosed. The computer-implemented method includes: receiving, at a server, a first object update message from a server-side application, wherein the first object update message includes a first object identifier; identifying, among a plurality of object-client registration records, an object-client registration record that includes the first object identifier; updating the object-client registration record in accordance with the first object update message; selecting a set of client identifiers associated with the first object identifier from the object-client registration record; and, for a first client identifier in the selected set of client identifiers, sending a second object update message to a first client device associated with the first client identifier, wherein the second object update message includes the first object identifier.

27 Claims, 12 Drawing Sheets

(56) References Cited

U.S. PATENT DOCUMENTS

| | | | |
|---|---|---|---|
| 7,383,289 B2* | 6/2008 | Kraft | 1/1 |
| 7,480,907 B1* | 1/2009 | Marolia et al. | 717/174 |
| 7,962,918 B2 | 6/2011 | Schaefer et al. | |
| 8,015,269 B2* | 9/2011 | Kiyohara et al. | 709/220 |
| 8,200,755 B2* | 6/2012 | Fujimoto et al. | 709/204 |
| 8,359,330 B2* | 1/2013 | Sakamoto | 707/777 |
| 8,442,943 B2* | 5/2013 | Multer et al. | 707/621 |
| 2002/0024947 A1* | 2/2002 | Luzzatti et al. | 370/352 |
| 2002/0111972 A1* | 8/2002 | Lynch et al. | 707/523 |
| 2003/0023770 A1* | 1/2003 | Barmettler et al. | 709/327 |
| 2003/0028683 A1 | 2/2003 | Yorke et al. | |
| 2003/0066065 A1* | 4/2003 | Larkin | 717/177 |
| 2003/0120624 A1* | 6/2003 | Poppenga et al. | 707/1 |
| 2003/0120873 A1 | 6/2003 | Kanaley | |
| 2003/0195951 A1* | 10/2003 | Wittel et al. | 709/220 |
| 2003/0221190 A1* | 11/2003 | Deshpande et al. | 717/171 |
| 2004/0015942 A1* | 1/2004 | Branson et al. | 717/168 |
| 2004/0064650 A1 | 4/2004 | Johnson | |
| 2004/0107242 A1* | 6/2004 | Vert et al. | 709/203 |
| 2004/0128346 A1 | 7/2004 | Melamed et al. | |
| 2004/0261082 A1 | 12/2004 | Steere et al. | |
| 2005/0097610 A1* | 5/2005 | Pedlow et al. | 725/80 |
| 2006/0092861 A1 | 5/2006 | Corday et al. | |
| 2006/0168325 A1 | 7/2006 | Wood et al. | |
| 2006/0174242 A1* | 8/2006 | Zhu et al. | 717/172 |
| 2007/0079091 A1* | 4/2007 | Collins et al. | 711/163 |
| 2007/0088733 A1* | 4/2007 | Bodge et al. | 707/102 |
| 2008/0098473 A1* | 4/2008 | Liu et al. | 726/13 |
| 2008/0114860 A1* | 5/2008 | Keys et al. | 709/219 |
| 2008/0183628 A1* | 7/2008 | Oliver et al. | 705/71 |
| 2008/0270409 A1* | 10/2008 | Naito et al. | 707/10 |
| 2009/0003620 A1 | 1/2009 | McKillop et al. | |
| 2009/0018998 A1 | 1/2009 | Patten, Jr. et al. | |
| 2009/0042536 A1* | 2/2009 | Bernard et al. | 455/406 |
| 2009/0042563 A1* | 2/2009 | Bernard | 455/432.1 |
| 2009/0172177 A1* | 7/2009 | Lu | 709/230 |
| 2009/0234927 A1* | 9/2009 | Buzescu | 709/206 |
| 2009/0248739 A1 | 10/2009 | Cao et al. | |
| 2009/0305778 A1* | 12/2009 | Yu et al. | 463/29 |
| 2010/0057839 A1* | 3/2010 | Sakai et al. | 709/203 |
| 2010/0106932 A1* | 4/2010 | Ogasawara | 711/166 |
| 2010/0115203 A1 | 5/2010 | White | |
| 2010/0235321 A1* | 9/2010 | Shukla et al. | 707/610 |
| 2010/0238919 A1* | 9/2010 | Froelich | 370/352 |
| 2010/0250860 A1 | 9/2010 | Potnis et al. | |
| 2010/0262948 A1 | 10/2010 | Melski et al. | |
| 2010/0274875 A1 | 10/2010 | Banno et al. | |
| 2010/0318967 A1* | 12/2010 | Bhatia et al. | 717/122 |
| 2010/0333080 A1* | 12/2010 | Keys et al. | 717/171 |
| 2011/0047594 A1* | 2/2011 | Mahaffey et al. | 726/1 |
| 2011/0113068 A1* | 5/2011 | Ouyang et al. | 707/784 |
| 2011/0314048 A1* | 12/2011 | Ickman et al. | 707/769 |

* cited by examiner

Client Notification Table 134

| Client Notification Record 201 | |
|---|---|
| Client ID | 202 |
| Object 1 | 204-1 |
|   Object ID | 206-1 |
|   Version Info | 208-1 |
|   Payload (optional) | 210-1 |
| ... | |
| Object N | 204-N |

FIG. 2A

Object-Client Registration Table 136

| Object-Client Registration Record 221 | |
|---|---|
| Object ID | 222 |
| Version Info | 224 |
| Deleted Flag | 226 |
| Payload (optional) | 228 |
| Last Object Update Timestamp (optional) | 229 |
| Client 1 | 230-1 |
|   Client ID | 232-1 |
| ... | |
| Client N | 230-N |

FIG. 2B

Object State Table 240

| Object State Record 241 | |
|---|---|
| Client ID | 242 |
| Object 1 | 244-1 |
|   Object ID | 246-1 |
|   Registration Flag | 248-1 |
|   Version Info (optional) | 250-1 |
| ... | |
| Object N | 244-N |

FIG. 2C

Object Update Notification Delivery Mechanism (I)

Object Update Notification Delivery Mechanism (II)

METHOD AND SYSTEM FOR MIGRATING OBJECT UPDATE MESSAGES THROUGH SYNCHRONOUS DATA PROPAGATION

PRIORITY

This application claims priority under 35 U.S.C. 119(e) to U.S. Provisional Patent Application 61/389,160 filed Oct. 1, 2010, which is hereby incorporated by reference in its entirety.

TECHNICAL FIELD

The disclosed embodiments relate generally to a client-server network environment, and in particular, to a system and method for migrating object update messages in a distributed network system through synchronous data propagation.

BACKGROUND

Object caching is a network technology used by web-based services in modern distributed systems for reducing latency, supporting disconnected operations, and improving user experience. This technology is becoming more popular with the increasing use of mobile devices such as smartphones and the development of cloud computing technology. Moreover, it is becoming a reality that a user of a web-based service often owns multiple terminals such as a desktop, a laptop, a tablet, a smartphone, etc., and the user can choose any of the terminals for accessing the service at any moment. This situation poses a significant challenge for object caching on how to keep objects cached at different terminals up-to-date. For example, if a user updates his or her calendar from a mobile phone, then the calendar cached at a desktop will be stale and must be updated accordingly. In those distributed systems involving hundreds of millions of users and trillions of objects, this is a non-trivial task.

SUMMARY

In accordance with some embodiments described below, a computer-implemented method in a distributed network system is disclosed. The distributed network system includes at least one server having memory and one or more processors and the server has access to a plurality of object-client registration records, each record including an object identifier and a set of client identifiers associated with the object identifier. The computer-implemented method includes receiving a first object update message from a server-side application, wherein the first object update message includes a first object identifier; identifying, among the plurality of object-client registration records, an object-client registration record that includes the first object identifier; updating the object-client registration record in accordance with the first object update message; selecting a set of client identifiers associated with the first object identifier from the object-client registration record; and for a first client identifier in the selected set of client identifiers, sending a second object update message to a first client device associated with the first client identifier, wherein the second object update message includes the first object identifier.

In accordance with some embodiments described below, a server system in a distributed network system is disclosed, the server system having one or more processors for executing programs and memory to store data and to store one or more programs to be executed by the one or more processors. The server system has access to a plurality of object-client registration records, each record including an object identifier and a set of client identifiers associated with the object identifier. The one or more programs include instructions for: receiving a first object update message from a server-side application, wherein the first object update message includes a first object identifier; identifying, among the plurality of object-client registration records, an object-client registration record that includes the first object identifier; updating the object-client registration record in accordance with the first object update message; selecting a set of client identifiers associated with the first object identifier from the object-client registration record; and for a first client identifier in the selected set of client identifiers, sending a second object update message to a first client device associated with the first client identifier, wherein the second object update message includes the first object identifier.

In accordance with some embodiments described below, a non-transitory computer readable-storage medium storing one or more programs for execution by one or more processors of a server system is disclosed, the server system having access to a plurality of object-client registration records, each record including an object identifier and a set of client identifiers associated with the object identifier. The one or more programs include instructions for: receiving a first object update message from a server-side application, wherein the first object update message includes a first object identifier; identifying, among the plurality of object-client registration records, an object-client registration record that includes the first object identifier; updating the object-client registration record in accordance with the first object update message; selecting a set of client identifiers associated with the first object identifier from the object-client registration record; and for a first client identifier in the selected set of client identifiers, sending a second object update message to a first client device associated with the first client identifier, wherein the second object update message includes the first object identifier.

BRIEF DESCRIPTION OF DRAWINGS

The aforementioned embodiment of the invention as well as additional embodiments will be more clearly understood as a result of the following detailed description of the various aspects of the invention when taken in conjunction with the drawings. Like reference numerals refer to corresponding parts throughout the several views of the drawings.

FIGS. 2A to 2C are block diagrams illustrating data structures used by the distributed network system for distributing object updates in accordance with some embodiments.

DESCRIPTION OF EMBODIMENTS

Figure 1:
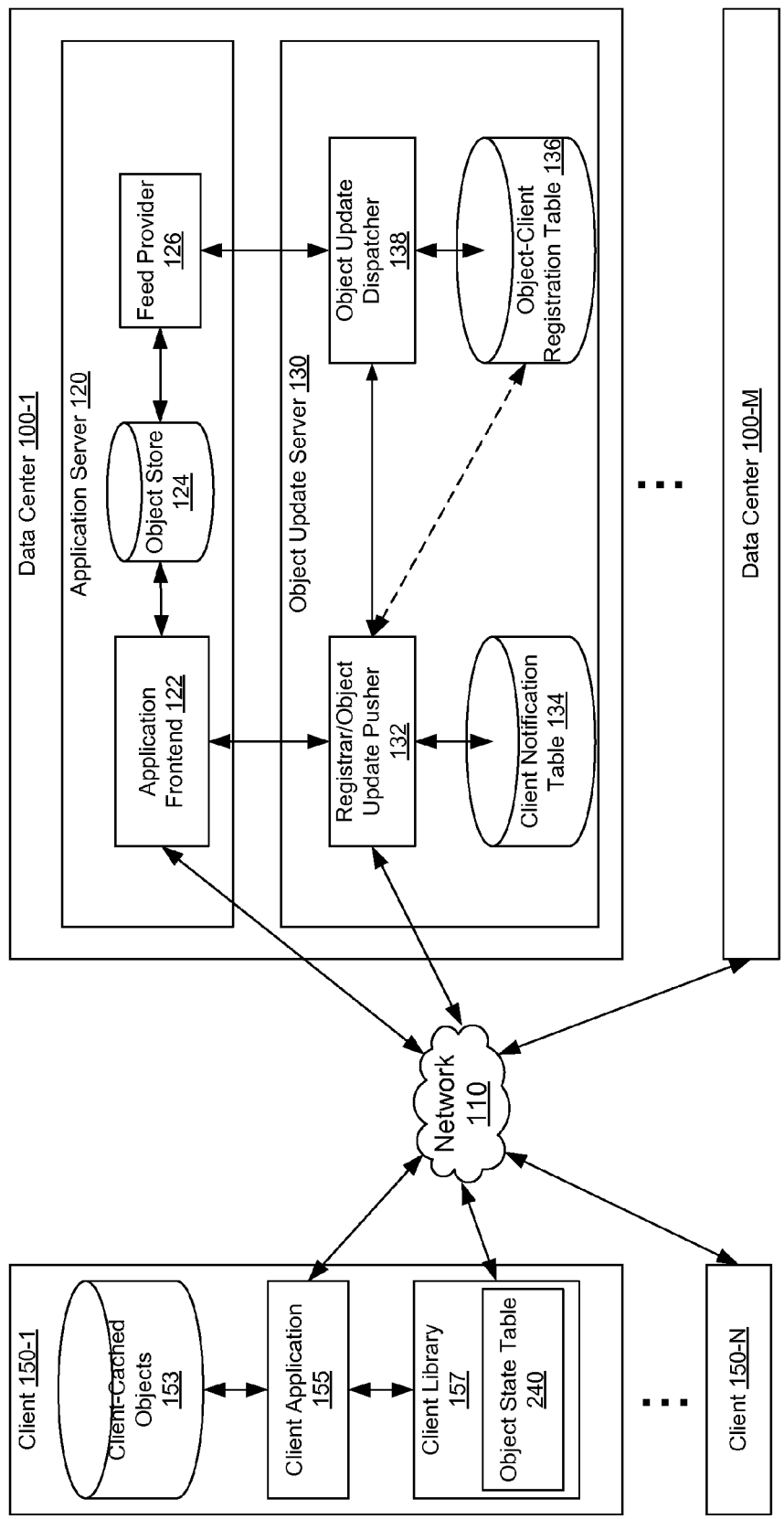
FIG. 1 is a block diagram illustrating a distributed network system for distributing object updates in accordance with some embodiments.

Reference will now be made in detail to embodiments, examples of which are illustrated in the accompanying drawings. While the invention will be described in conjunction with the embodiments, it will be understood that the invention is not limited to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

According to some embodiments, the present invention is directed to a large-scale object cache update system. It is designed to keep web objects cached at the client devices up to date with a data repository in a distributed network system. At a high level, the system is configured to consume a feed of object updates from the data repository and disseminate the object updates to the appropriate client devices based on what objects a respective client device has cached and registered for receiving the corresponding object updates. One skilled in the art would understand that the terms including "object update," "object change," and "object invalidation" appearing in similar contexts have substantially the same meaning and are interchangeable with each other throughout this specification.

In some embodiments, a client device (also referred to as "a client" in this application) corresponds to a client-side laptop/desktop/tablet computer or a portable communication device such as a smartphone or a server-side computer running an application. Note that the system can be used by an application (e.g., a web-based service) that has hundreds of millions of client devices (many of which may be disconnected from the network at any given time) and trillions of objects, such that any client may cache a large number of objects and the same object may be cached by many clients simultaneously.

Throughout this application, the term "object" refers to a piece of uniquely-identifiable, versioned data. For example, a user's web-based calendar or shared documents may be considered as objects. A user's bookmarks associated with a browser application can also be modeled as an object. Using the web-based calendar as an example, when the user accesses the web-based calendar from a mobile phone, the mobile phone downloads a copy of the calendar from a remote server and caches the object in a storage device of the mobile phone (e.g., the phone's memory device). Similarly, if the user accesses the web-based calendar from a desktop computer, the computer downloads a copy of the calendar from the remote server and caches the object in a storage device of the desktop computer. By caching the calendar at the client device, the user has the benefit of accessing the calendar even if the client device is disconnected from the network (e.g., the Internet). In some embodiments, the cached calendar is stored in a client device's permanent storage device such that it is even available for user access after the device is rebooted.

A potential issue with the object caching approach is that a cached calendar at a first client device may become stale if a user adds a new appointment to the calendar from a second client device, which has not yet arrived at the first client device. To avoid this issue, all the other client devices that cache the calendar need to have the calendar's latest version including the new appointment as soon as possible. Note that a client-cached object does not have to be exclusively available for an individual user. In some embodiments, an object may be shared by multiple users but the issue remains the same in term of propagating an object update initiated by one user from one client device to the other client devices used by others.

In some embodiments, the object cache update system is designed to meet the following requirements:

1. High scalability for managing a large number of client devices and objects. The system is able to support hundreds of millions of users with each user, on average, having 3 to 4 client devices (including desktop, phone, notebook/netbook, etc). Furthermore, tens of thousands of objects such as documents, electronic messages, address books, calendars, and bookmarks may be cached at individual client devices, which require a significant amount of state data to track their updates.

2. High object update rate across applications. Note that applications such as web-based email and address books may have very high update rates (e.g., in tens of thousands per second), which may be even higher if a single set of servers is used for supporting multiple applications. In some embodiments, the system can handle an aggregate incoming object update rate of 100,000 queries-per-second (QPS) or even higher.

3. Handling disconnected clients appropriately. It is common that many client devices may be disconnected from cache updates for hours, days or even weeks. To deal with this phenomenon, the system is developed such that an object update server implementing the system knows not only what is to be delivered to a client device after being reconnected but also when to make the delivery. In some embodiments, after determining that a client device is gone forever (e.g., the client device may have been reformatted), the object update server is configured to perform garbage collection for those object updates that are yet to be delivered to the client device to free the resources for other client devices.

4. A guarantee of delivering object updates to clients. The object update system of the present application is designed such that, once a client device has registered for receiving updates to an object, it is guaranteed to eventually receive at least the most recent update to the object as long as the client device is not permanently disconnected. Note that this guarantee simplifies the development of applications that use the object update system. For example, an application does not have to provide a path for pushing/pulling the object updates from the object update server, thereby simplifying the application's code base.

As a system for determining which objects cached at which clients are outdated and then delivering object updates to them appropriately, the object update system of the present application is configured to implement the following features:

1. Tracking and delivery: The object update server tracks objects cached at respective client devices and propagates each update to an object to the client devices that have cached the object and registered for receiving updates to the objects.
2. Reliability of object cache updates: The object update server provides an incremental object update stream and combines multiple updates for the same object when possible so that a client device can safely bypass the object's intermediate stages.
3. Low latency: The object update server routes object updates to the appropriate clients within, e.g., seconds of receiving them, which is sufficient for most collaborative applications that do not require sub-second latency.

FIG. 1 is a block diagram illustrating a distributed network system 10 for propagating object updates in accordance with some embodiments including those embodiments depicted in FIGS. 1A to 1F of U.S. Provisional Patent Application No. 61/389,160. The distributed network system 10 includes a plurality of clients (150-1, . . . , 150-N) and a plurality of data centers (100-1, . . . , 100-M), which are communicatively coupled to the plurality of clients through a communication network 110. Communication network(s) 110 can be any wired or wireless local area network (LAN) and/or wide area network (WAN), such as an intranet, an extranet, the Internet, or a combination of such networks. In some embodiments, communication network 110 uses the HyperText Transport Protocol (HTTP) and the Transmission Control Protocol/Internet Protocol (TCP/IP) to transport information between different networks. The HTTP permits client devices to access various information items available on the Internet via the communication network 110. For example, the "hanging GET" request supported by HTTP 1.1 is used for transmitting new messages from a server to a client. Because the client keeps a GET pending at the server, whenever there is a message to be sent, the server can simply "reply" to the client with the message. Other communication protocols that can be used by the communication network 110 include the Extensible Messaging and Presence Protocol (XMPP). The various embodiments, however, are not limited to the use of any particular protocol. The term "information item" as used throughout this specification refers to any piece of information or service that is accessible via a content location identifier (e.g., a URL or URI) and can be, for example, a web page, a website including multiple web pages, a document, a video/audio stream, a database, a computational object, a search engine, or other online information service.

As shown in FIG. 1, a client 150-1 includes a client application 155 and a set of client-cached objects 153 associated with the client application 155. For example, the client application 155 may be a web browser application for accessing Internet-based services and the set of client-cached objects 153 may include a set of bookmarks associated with the web browser, an address book and email messages associated with a web-based email application running within the web browser, and a set of appointments associated with a web-based calendar application within through the web browser. In some other embodiments, the client application 155 is a software program dedicated to a particular application or applications such as a web-based chat room and the client-cached objects 153 may include a set of instant messages associated with the chat room.

In some embodiments, the client 150-1 further includes a client library 157 for handling transactions relating to updates to the client-cached objects 153 or any other client-related transactions. As will be described below, the client library 157 includes one or more software modules, which help to register a particular object at an object update server 130 within the data center 100-1 as well as receiving, processing, and notifying the client application 155 of updates directed to the object. In some embodiments, the client library 157 may be a component (e.g., a plug-in) of the client application 155. In this case, the client library 157 may use the client application 155's communication channel for communicating with the data centers (100-1, . . . , 100-M). In some other embodiments, the client library 157 is a standalone application that may have its own communication channel with the data centers (100-1, . . . , 100-M). The client library 157, like the client application 155, may be implemented in any programming languages including Java, Javascript, C++, etc. For illustration, two separate double-arrow lines are depicted in FIG. 1 as connecting the client application 155 and the client library 157 to the communication network 110, respectively and these two lines may or may not represent two distinct communication channels.

In order to support a large number of client devices that may be deployed across the world, the distributed network system 10 may include multiple data centers at different locations. FIG. 1 illustrates that one of the data centers 100-1 includes an application server 120 and an object update server 130. These two servers represent two types of server-side applications. The application server 120 provides a web-based service (e.g., calendar) to the clients (150-1, . . . , 150-N). It includes an application frontend 122 for interacting with the clients and stores different users' calendars in an object store 124 (which may be a database application associated with the application server 120). In addition, the application server 120 includes a feed provider 126 that has access to the object store 124 and communicates object updates (including insertions, deletions, and modifications) to the object update server 130. In some embodiments, the application server 120 and the object update server 130 each may run on one or more server computers. In some other embodiments, the two types of applications may run on the same set of servers. One skilled in the art would understand that the configuration shown in FIG. 1 is for illustration and it does not restrict the implementation of the present application in any way.

In some embodiments, the object update server 130 includes a registrar 132 for receiving object registration requests from the clients 150 and passing them to an object update dispatcher 138. One skilled in the art would understand that terms including "request," "message," "alert," and "notification" appearing in similar contexts have substantially the same meaning and are interchangeable with each other throughout this specification. In addition, the registrar 132 acts as an object update pusher for pushing an object update to a respective client that has registered for receiving updates the object if the object cached by the client is deemed to be stale. In some embodiments, the registrar/object update pusher 132 uses a data structure called "client notification table" 134 to track the status of an object update for a particular client. For example, when it receives a new object update directed to a particular client, the object update pusher 132 generates a new entry in the client notification table 134. After receiving an object update confirmation message from the client, the object update pusher 132 deletes the corresponding entry from the client notification table 134 to complete the delivery of an object update message to the client. A more detailed description of the client notification table 134 is provided below in connection with FIG. 2A. In some embodiments, the registrar/object update pusher 132 uses the application server 120's communication channel with the communication network 110 for receiving object registration requests from the clients 150 or pushing object update messages to the clients 150 through, e.g., the application frontend 122. In some other embodiments, the registrar/object update pusher 132 has its own communication channel with the communication network 110.

In some embodiments, the object update dispatcher 138 is responsible for maintaining the client registration status and the object update status of the distributed network system 10. For example, in response to the object registration requests received from the registrar 132, the object update dispatcher 138 generates the corresponding entries in a data structure called "object-client registration table" 136 so that an object update message will be delivered to a set of clients that have appropriately registered for receiving updates to the object. Moreover, the object update dispatcher 138 is also an interface of the object update server 130 with the application server 120. For example, upon receipt of object updates from the feed provider 126, the object update dispatcher 138 updates the corresponding entries in the object-client registration table 136 accordingly. A more detailed description of the object-client registration table 136 is provided below in connection with FIG. 2B. Although FIG. 1 depicts a single box for each of the registrar 132 and the dispatcher 138, one skilled in the art would understand that there may be multiple registrars and dispatchers running in the same object update server 130. In some embodiments, the dispatchers and registrars are stateless and load-balanced such that any of these server-side modules can handle a request meant for that type of server-side module.

Different components of the object update server 130 work collectively to track a set of clients 150, each client having registered for receiving updates to a predefined set of objects. For example, the clients 150 use the register/deregister calls (or messages) to express interest/disinterest in particular objects. After the object update server 130 is notified by the application server 120 of a latest version of an object via an object update message, it determines which of the clients 150 that have registered for receiving updates to the object have an older version of the object than the latest version specified in the object update message and sends the corresponding object update notification messages to these clients 150. Subsequently, a respective client 150-1 acknowledges the receipt of a corresponding object update notification message by returning a confirmation message to the object update server 130, thereby ensuring that the object update is reliably delivered.

For example, if the client 150-1 successfully registers with the object update server 130 for an object X's version V, the object update server 130 guarantees that the client 150-1 will be informed if any object update occurs to the object X with a more recent version V' than V. In some embodiments, the version V in the object registration request is the latest version known to the client 150-1 at the time of registration. If no version information is provided by the client 150-1, the object update server 130 uses the object's latest version known to the object update server 130 for the client 150-1's registration request. Note that the object update server 130 may learn the object's latest version from another client 150-N that has already registered for the same object. Alternatively, the object update server 130 may get the object's latest version information from the application server 120.

As described above, the object update server 130 guarantees that after a client 150-1 has registered for an object, it will be notified of subsequent updates to that object. This delivery guarantee allows the other applications that rely upon the object update server 130 for maintaining cache coherency to have a more simplified design and implementation, e.g., being freed from implementing a polling path for retrieving object update messages in their code base.

Note that the object update server 130's guarantee provides the application developers with flexibility, simplicity, and efficiency in the implementation without comprising the ultimate accuracy even in the situation that the object update server 130 may drop, reorder object updates, or deliver the same object update multiple times due to network congestion. For example, an object X may be modified twice within a short time period to create a first version $V_1$ and then a second version $V_2$. In this case, the object update server 130 may automatically bypass the delivery of the object update associated with the first version $V_1$ and only deliver the object update associated with the second version $V_2$. In some embodiments, the object update server 130 may deliver the updates for a particular object in an order other than that in which the object updates were generated. For example, if an object Y has four consecutive versions $V_1$, $V_2$, $V_3$, $V_4$, the object update server 130 may deliver them in the reverse order $V_4$, $V_3$, $V_2$, $V_1$.

As noted above, various data structures are used by different components of the distributed network system 10 to perform the designated operations to maintain the cache coherency between the clients 150 and the data centers 100. FIGS. 2A to 2C are block diagrams illustrating some of the data structures for distributing object updates in accordance with some embodiments.

In particular, FIG. 2A depicts an exemplary client notification table 134 (from FIG. 1) that is used by the object update server 130 (e.g., the object update pusher 132) for tracking the object update delivery status for the clients. The exemplary client notification table 134 (from FIG. 1) includes one or more client notification record 201. Each record 201 includes a client ID 202 and one or more object records (204-1, ..., 204-N). In some embodiments, the client ID 202 is a unique parameter that the object update server 130 assigns to a respective client device in response to, e.g., the first object registration request from the client device. In some embodiments, the client ID 202 is provided by the application server 120 based at least in part on a unique parameter associated with the client device (e.g., its IP address). The unique parameter associated with the client device can be used by the object update server 130 to avoid sending an object update to a client device from which the object update originates. An object record 204-1 further includes an object ID 206-1 that uniquely identifies an object (e.g., a particular user's calendar account or email account), version information 208-1 that indicates the current version of the object that the object update server 130 is aware of, and an optional payload 210-1 that includes any information that the object update server 130 plans to deliver to the client device. In some embodiments, the size of an object ID is between 8 bytes and 256 bytes. The version information 208-1 may include a monotonically increasing number that the application server 120 assigns to every object update. In some other embodiments, the version information 208-1 may include a timestamp that the application server 120 assigns to every object update.

FIG. 2B depicts an exemplary object-client registration table 136 (from FIG. 1) that is used by the object update server 130 (e.g., the object update dispatcher 138) for maintaining the object update status at the respective clients. The exemplary object-client registration table 136 includes one or more object-client registration record 221. Each record 221 includes an object ID 222, version information 224, a deleted flag 226, an optional payload 228, an optional last object update timestamp 229, and one or more client records (230-1, ..., 230-N). In some embodiments, the deleted flag 226 is set to be "yes" after the feed provider 126 notifies the object update dispatcher 138 that a particular object has been deleted by the application server 120. As will be explained below, this flag is used for preventing any client from registering for this object in the future as well as for performing garbage collection at the object-client registration table. The last object update timestamp is used for identifying the object's most recent update that has arrived at the object update dispatcher 138 but has not yet been delivered to the respective clients, which is used for re-delivering the object update after, e.g., the object update server 130 recovers from a system breakdown.

FIG. 2C depicts an exemplary object state table 240 that is used by the client library 157 (FIG. 1) for tracking the status of registered objects at a respective client 150-1. The exemplary object state table 240 includes one or more object state records 241. Each record 241 includes a client ID 242 that is associated with the client 150-1 and one or more object records (244-1, ..., 244-N), each record corresponding to a client-cached object that the client 150-1 has registered for receiving future updates to the object. In some embodiments, an object record 244-1 includes an object ID 246-1, a registration flag 248-1, and optional version information 250-1. As will be described below, the registration flag 248-1 may have one of multiple values: (i) "Registered" (or "R") for a completion of object registration, (ii) "Pending Registration" (or "PR") for an initiation of object registration, (iii) "Deregistered" (or "D") for a completion of object deregistration, and (iv) "Pending Deregistration" (or "PD") for an initiation of object deregistration.

As an object cache updating system, the distributed network system 10 performs at least two types of transactions for keeping an object cached at a client device up-to-date with an update to the object by another client device: (i) (de)registering at an object update server a client's request for receiving an update to an object cached by the client, which is described below in detail in connection with FIGS. 3A to 3D; and (ii) propagating an update to an object from an application server to a set of clients that have registered for receiving updates to the object, which is described below in detail in connection with FIGS. 4A to 4D.

Figure 3A:
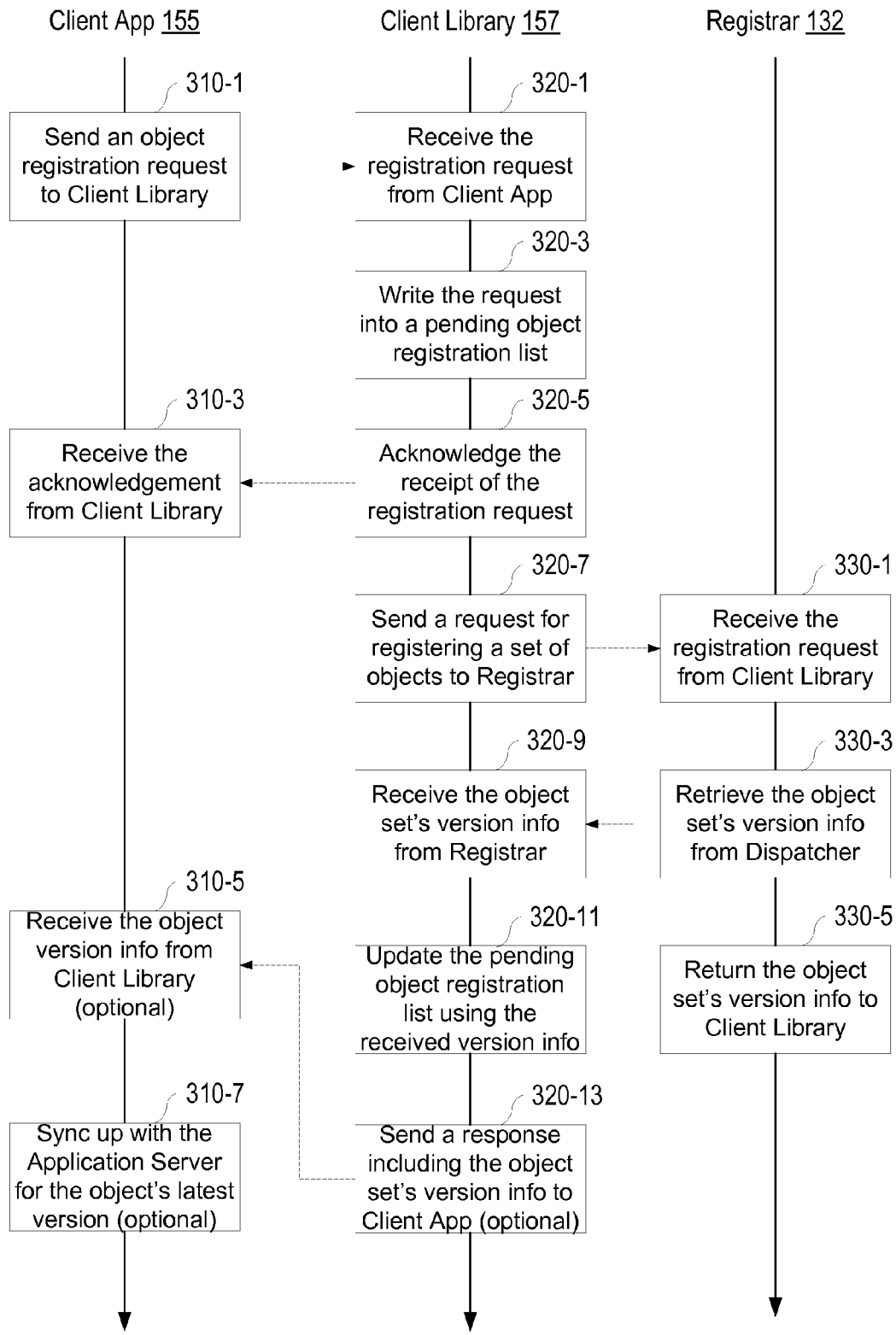
FIGS. 3A and 3B are flow charts illustrating how a client device communicates with an object update server for receiving future updates to an object cached by the client device in accordance with some embodiments.
Figure 3B:
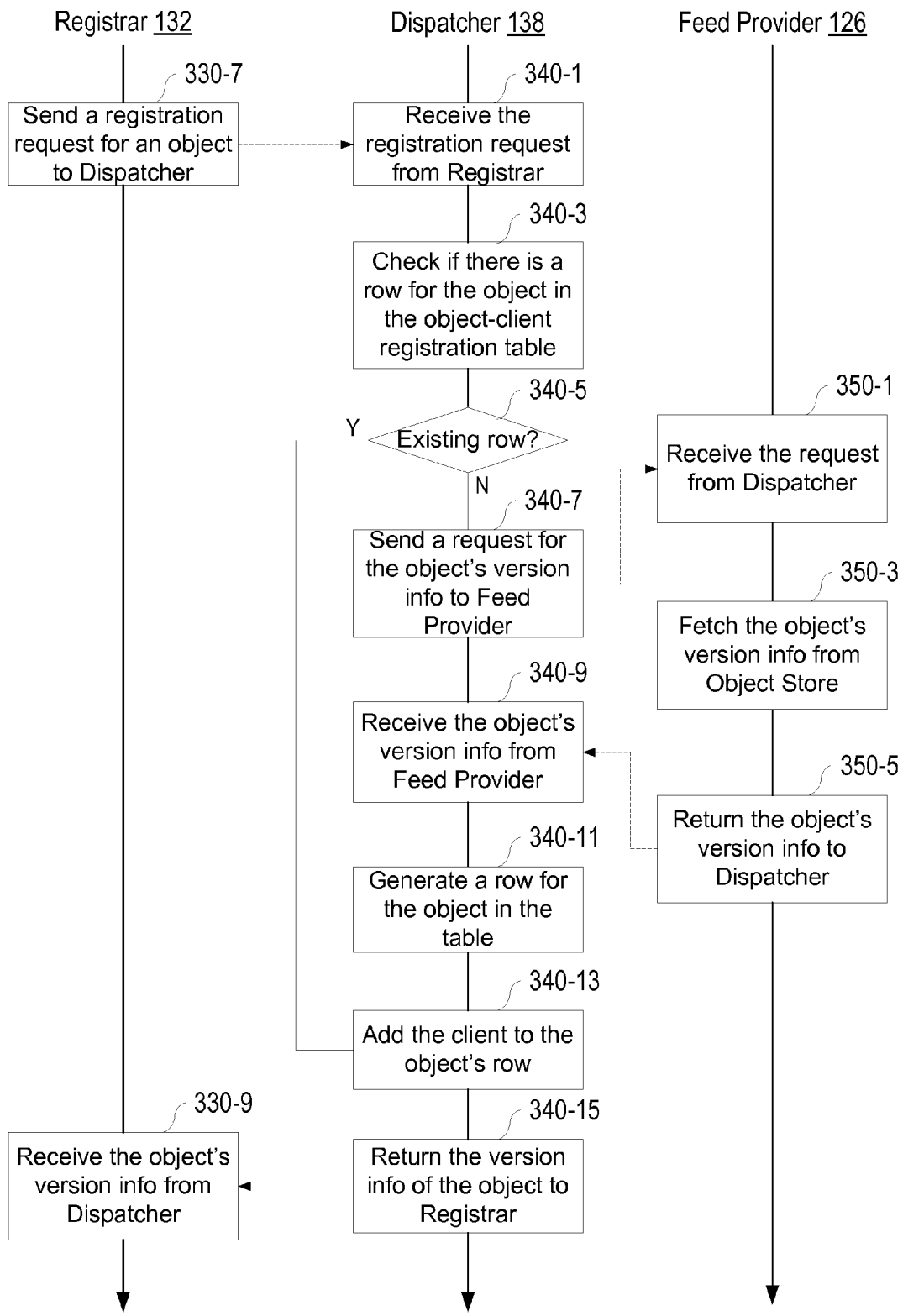

In particular, FIGS. 3A and 3B are flow charts illustrating how a client device 150-1 registers with an object update server 130 for receiving future updates to an object in accordance with some embodiments. As shown in FIG. 3A, the client application 155 sends (310-1) an object registration request including an object ID to the client library 157. In some embodiments, the client application 155 makes a function call to the client library 157 for passing the object ID. In some embodiments, the request includes the object's current version known to the client application. Upon receiving (320-1) the registration request, the client library 157 writes (320-3) the request into a pending object registration list. In some embodiments, the pending object registration list is stored in the object state table associated with the client library 157. For a new object registration request, the client library 157 generates a new entry in the table using the object's current version information and sets the entry's registration flag to be "PR", which the client library 157 may revisit to determine whether it needs to resend an object registration request to the registrar 132. Regardless of whether it has received the registration confirmation from the registrar 132, the client library 157 acknowledges (320-5) its receipt of the registration request to free the client application 155 for other transactions. In some embodiments, the client library 157 makes this acknowledgment by invoking a callback function provided by the client application 155.

In some embodiments, the client library 157 sends (320-7) a request for registering a set of objects to the registrar 132 according to a predefined schedule. For example, the client library 157 may send out the request after it has accumulated a predefined number (e.g., 5) of registration and deregistration requests from the client application 155 or after a predefined time period (e.g., a second or less). In some other embodiments, the client library 157 may submit the request whenever it receives a new request from the client application 155. In some embodiments, this request includes a set of object IDs and a client ID associated with the client device. The register 132, upon receiving (330-1) the request from the client library 157, retrieves (330-3) the objects' version information from the dispatcher 138 and returns (330-5) the retrieved version information to the client library 157. As will be explained below in connection with FIG. 3B, an object's version information ultimately comes from an application server 120, which has the latest version of the object. As shown in FIG. 1, because both the client application 155 and the client library 157 are on the client side, they may communicate with each other by making local function calls. Because the registrar 132 is on the server side, the client library 157 may communicate with the registrar 132 using a remote message delivery mechanism.

The client library 157 receives (320-9) the objects' version information from the registrar 132 and updates (320-11) the pending object registration list using the received version information. In some embodiments, for each object in the object set, the client library 157 replaces the corresponding entry's version information in the object state table with the one received from the registrar (if they are different) and sets the entry's registration flag to be "R" to mark its receipt of confirmation from the registrar 132. In some embodiments, the client library 157 may delete the corresponding entry from the object state table 240 to mark its receipt of confirmation from the registrar 132. In some embodiments, the client library 157 performs the operation 320-7 for those entries having a registration flag of "PR" multiple times until it receives a reply from the registrar 132 or gives up the attempt to register the object with the object update server 130. In either case, the client library 157 returns (320-13) a response to the client application 155 (310-5). If the response indicates that the application server 120 has a more recent version of the object, the client application 155 then synchronizes (310-7) with the application server 120 (e.g., the application frontend 122) to receive the latest version of the object.

In some embodiments, the operations 310-5, 310-7, and 320-13 are optional such that the client library 157 does not return a registered object's latest version info to the client application 155. Rather, the client application 155 is not notified that there is a more recent version of the object in connection with an object registration request. Instead, it will be notified after the registrar 132 pushes an object update to the client library 157 and the client application 155, which is described below in connection with FIG. 4B.

FIG. 3B depicts a flow chart that provides more details of the operation 330-3 performed by the registrar 132. At some point, the registrar 132 sends (330-7) an object registration request including a client ID and an object ID to the dispatcher 138. Upon receiving (340-1) the registration request, the dispatcher 138 checks (340-3) if there is a row or record in the object-client registration table that matches the object ID. If true (340-5, Yes), the dispatcher 138 adds (340-13) the client ID to identified row. Otherwise (340-5, No), it may indicate that the object update server 130 has not received any client's registration request for this object. In this case, the dispatcher 138 sends (340-7) a request for the object's version information to the application server 120 (e.g., the feed provider 126). Upon receiving (350-1) the request, the feed provider 126 fetches (350-3) the requested version information from the object store 124, which includes information about the most recent version of the object, and returns (350-5) the most recent version information to the dispatcher 138.

Upon receipt (340-9) of the most recent version information, the dispatcher 138 generates (340-11) a new row in the object-client registration table using the object ID and the most recent version information and adds (340-13) a new entry for the client using the client ID. Next, the dispatcher 138 returns (340-15) the object's most recent version information to the registrar 132 (330-9). As described above, this most recent version information is returned to the client library 157 and, optionally, to the client application 155.

Figure 3C:
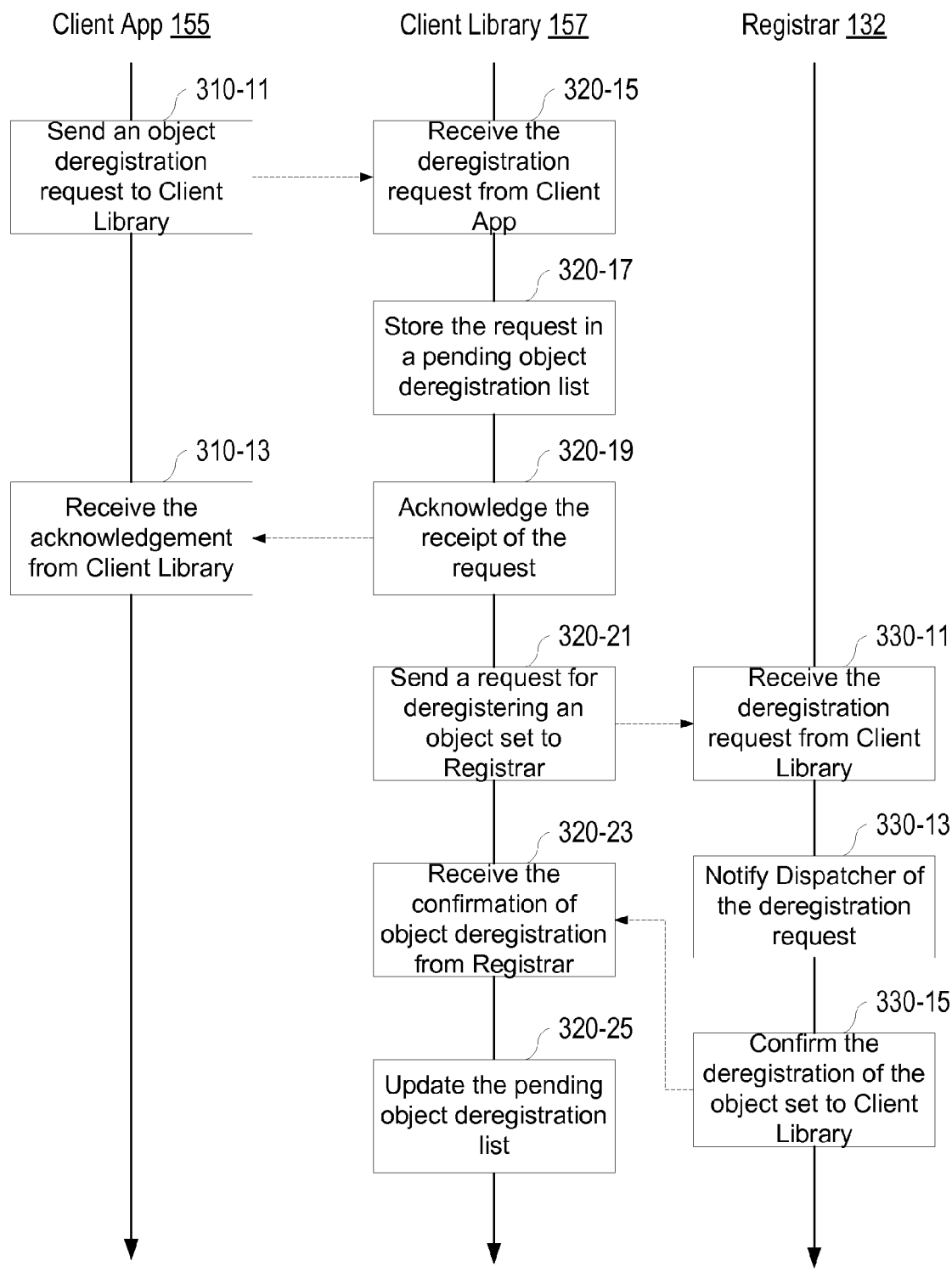
FIGS. 3C and 3D are flow charts illustrating how the client device communicates with the object update server for stopping receiving updates to an object cached by the client device in accordance with some embodiments.
Figure 3D:
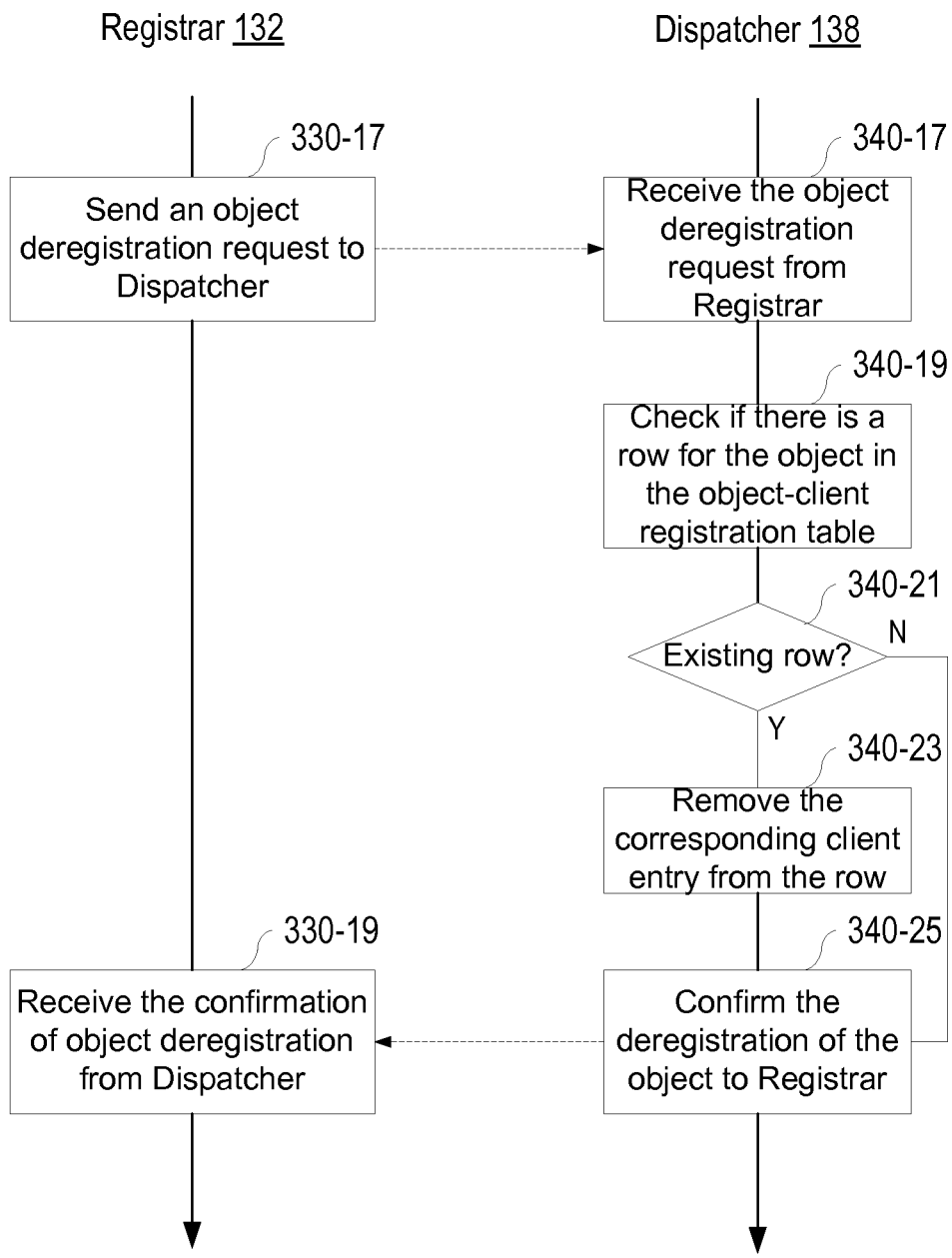

FIGS. 3C and 3D are similar to FIGS. 3A and 3B except that they illustrate how the client device 150-1 deregisters an object with the object update server 130 so as to stop delivering future updates to the object cached in accordance with some embodiments.

As shown in FIG. 3C, the client application 155 sends (310-11) an object deregistration request including an object ID to the client library 157. In some embodiments, this object deregistration request is a function call to the client library 157. Upon receiving (320-15) the deregistration request, the client library 157 stores (320-17) the request in a pending object deregistration list. In some embodiments, for a new object deregistration request, the client library 157 identifies an existing entry in the table using the object ID and sets the entry's registration flag to be "PD," indicating that the client application 155 no longer wishes to receive future object updates associated with the object ID. The client library 157 acknowledges (320-19) its receipt of the deregistration request to free the client application 155 for other transactions. In some embodiments, the client library 157 makes this acknowledgment by invoking a callback function provided by the client application 155.

In some embodiments, the client library 157 sends (320-21) a request for deregistering a set of objects to the registrar 132 according to a predefined schedule. For example, the client library 157 may send out the request after it has accumulated a predefined number (e.g., 5) of registration and deregistration requests from the client application 155 or after a predefined time period (e.g., a second or less). In some other embodiments, the client library 157 may submit the request whenever it receives a new request from the client application 155. This request includes a set of object IDs and a client ID associated with the client device 150-1. The registrar 132, upon receiving (330-11) the request from the client library 157, notifies (330-13) the dispatcher 138 of the set of object IDs and the associated client ID and returns (330-15) a confirmation message to the client library 157. Upon receipt (320-23) of the confirmation, the client library 157 may update (320-25) the pending object deregistration list by removing the deregistration request. In some embodiments, the client library 157 may update the entry in the object state table by changing the registration flag from "PD" to "D" to complete the object deregistration process.

FIG. 3D depicts a flow chart that provides more details of the operation 330-13 performed by the registrar 132. At some point, the registrar 132 sends (330-17) an object deregistration request including a client ID and an object ID to the dispatcher 138. Upon receiving (340-17) the deregistration request, the dispatcher 138 checks (340-18) if there is a row or record in the object-client registration table that matches the object ID. If true (340-21, Yes), the dispatcher 138 removes (340-23) the client entry from the row. Note that the object may still exist in the table because there may be other clients registering for the same object. Otherwise (340-21, No) or after the operation 340-23, the dispatcher 138 returns (340-25) a confirmation message of deregistering the client ID for the object ID to the registrar 132 (330-19).

Figure 4A:
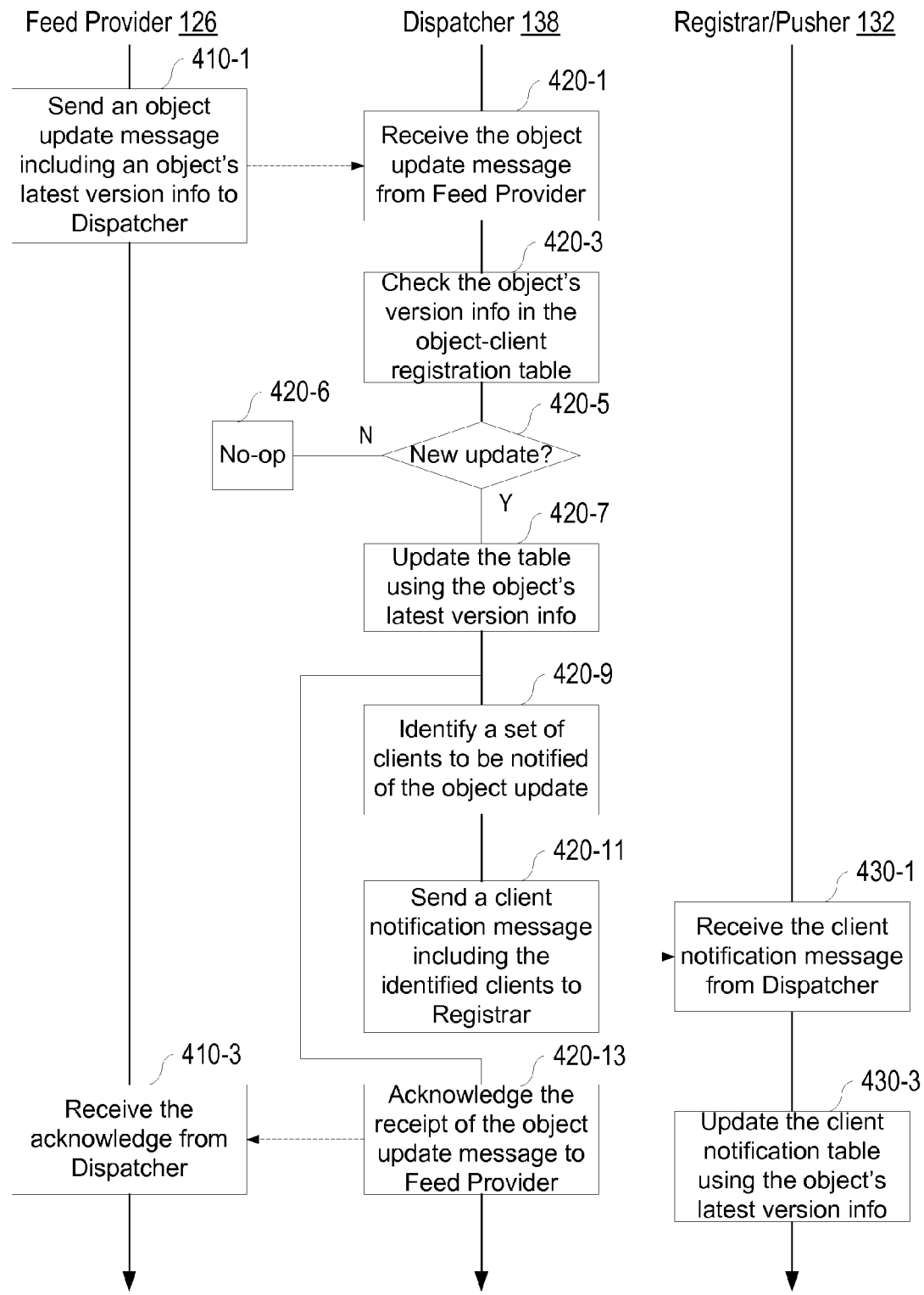
FIGS. 4A to 4D are flow charts illustrating how the object update server delivers to the client device an update to an object cached by the client device in accordance with some embodiments.

One goal of the object registration process described above is to enable the object update server 130 to perform a set of operations for delivering object updates to respective client devices 150, which is described below in connection with FIGS. 4A to 4D. In some embodiments, this set of operations is in response to the application server 120 receiving a latest version of an object from a respective client (e.g., client 150-N). As shown in FIG. 4A, the feed provider 126 sends (410-1) an object update message including the object's object ID and its latest version information to the object update dispatcher 138 to indicate that this object has been updated and the object update server 130 should notify any client that has registered with the object update server 130 for receiving updates to this particular object.

After receiving (420-1) the object update message, the dispatcher 138 queries its object-client registration table 136 for a record that has the object ID from the feed provider 126 and, if found, checks (420-3) the object's version information stored in the record by comparing the object's version information with the latest version information provided by the feed provider 126. This comparison result not only enables the object update server 130 to make sure that the latest version information be propagated to the corresponding clients but also helps to filter out those object update messages that were delivered out of order. For example, if the latest version information indicates that this is not a new object update (420-5, No), the dispatcher 138 may take no further action (420-6). Otherwise (420-5, Yes), the dispatcher 138 updates (420-7) the identified record in the object-client registration table using the latest version information and acknowledges (420-13) that it has received the object update message to the feed provider 126 (410-3).

Meanwhile, the object update dispatcher 138 identifies (420-9) a set of clients to be notified of the most recent object update. Note that the operations 420-9 and 420-13 are independent from each other and they may occur in any order. As shown in FIG. 2B, an object-client registration record 221 includes a set of client IDs identifying the client devices that have registered for a particular object. In some embodiments, a client device is the source of an object's latest version may also register with the object update server 130 for receiving updates to the object. Therefore, the dispatcher 138 screens the set of client IDs in the object-client registration record 221 using the client ID from the feed provider 126 and removes the entry corresponding to the source client device. Next, the dispatcher 138 sends (420-11) a client notification message to the object update pusher 132, the message including the screened set of client IDs. In response to the client notification message (430-1), the pusher 132 updates (430-3) the client notification table 134 using the object's latest version information contained in the client notification message. In some embodiments, the pusher 132 generates a new record in the client notification table 134 for a new client ID and adds a new object entry into the record for a new object ID. Note that a client ID in the client notification message may already have a corresponding record in the client notification table 134 if the object update pusher 132 has received another client notification message that includes an update to another object registered by the same client. In this case, the pusher 132 adds a new object entry to the existing record with the object's latest version information.

Figure 4B:
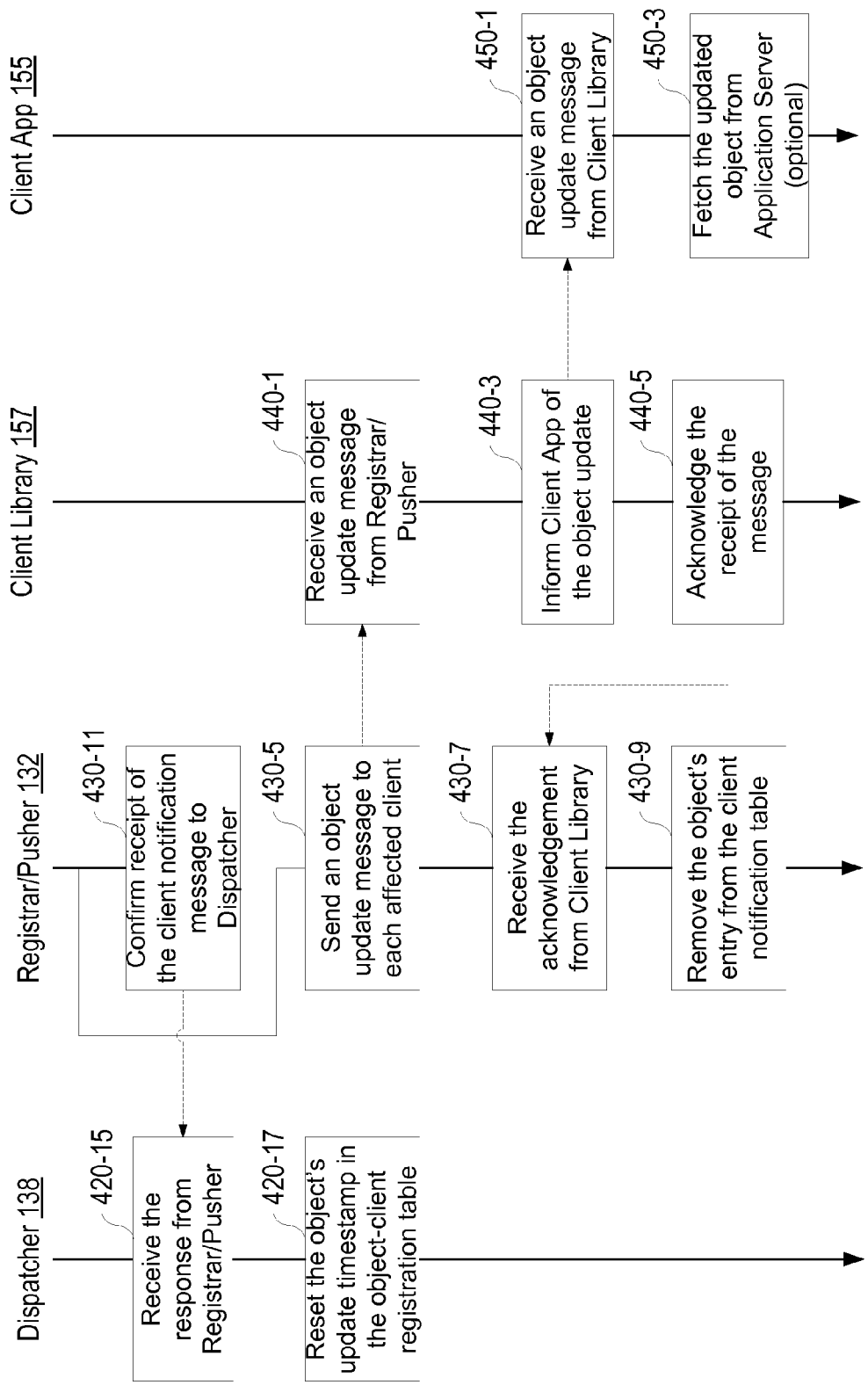

The flow charts shown in FIG. 4B are continuations of the ones shown in FIG. 4A. After receiving the client notification message, the pusher 132 sends (430-5) an object update message to each client identified in the client notification message. In other words, the pusher 132 may send out multiple object update messages to different affected clients in parallel without waiting for any client's acknowledgement. After receiving (440-1) the object update message, the client library 157 at a particular client (e.g., 150-1) informs (440-3) the client application 155 of the object update, e.g., via invoking a callback function, and acknowledges (440-5) the receipt of the object update message to the pusher 132. Upon receipt (430-7) of the acknowledgement, the object update pusher 132 (430-9) removes the object's entry from the corresponding record of the client notification table. The client application, upon receipt (450-1) of an object update message, may be activated to fetch (450-3) the updated object from the application server 120. In some embodiments, the updated object arrives at the client application 155 as part of the payload of the object update message. In this case, the client application 155 no longer needs to fetch the updated object from the application server 120.

Independently, the object update pusher 132 confirms (430-11) its receipt of the client notification message to the dispatcher 138. After receiving (420-15) the confirmation, the dispatcher 138 resets (420-17) the last object update timestamp of the object-client registration record to be, e.g., a null value. As explained above in connection with FIG. 2B, the last object update timestamp is used for determining whether the object update has been propagated to the affected clients. A non-null timestamp means that the object update has not been propagated. In some embodiments, when the object update server 130 recovers from a system crash, the object update dispatcher 138 will check this attribute for each record in the object-client registration table and identify those records having non-null timestamps so as to resend a new client notification message to the pusher 132 for each record.

The object update delivery process described above in connection with FIGS. 4A and 4B assumes that every message arrives at its destination in the right order and there is no drop of any message such that there is no need for redelivering any message. In reality, this assumption may not always be true from time to time. Accordingly, FIGS. 4C and 4D are flow charts illustrating how the object update server 130 handles the lost object update messages in accordance with some embodiments.

Figure 4C:
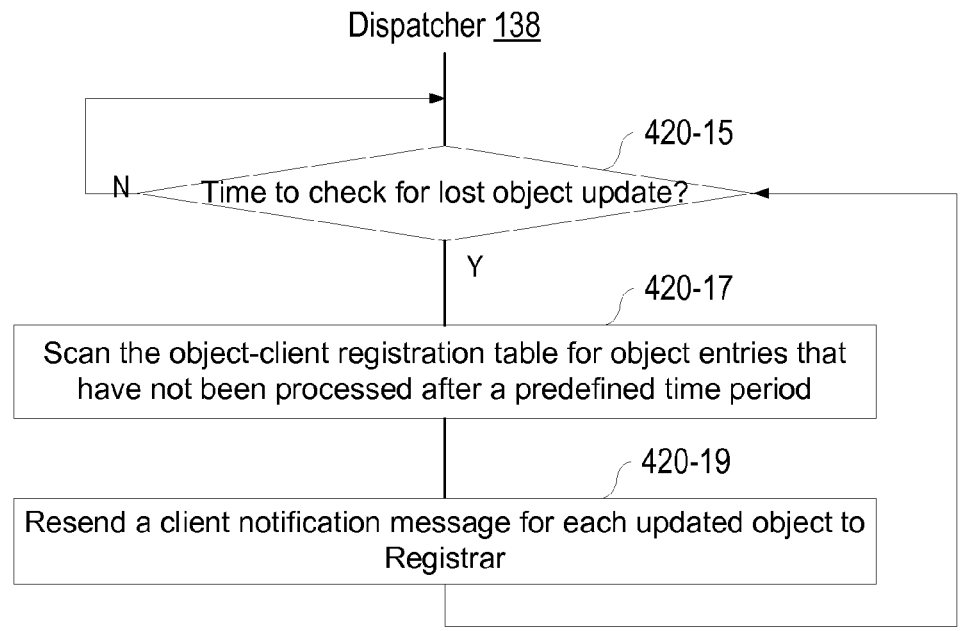

As shown in FIG. 4C, the object update dispatcher 138 implements a mechanism for identifying those object update messages that might be lost on their way to the object update pusher 132. In some embodiments, the dispatcher 138 checks whether there is any lost object update after a predefined condition is met (420-15, Yes), e.g., after a predefined time period. In particular, the dispatcher 138 scans (420-17) the object-client registration table for object records whose last object update timestamps are earlier than the current timestamp for at least a predefined amount of time (e.g., 10 minutes). As noted above, the dispatcher 138 resets an object record's last object update timestamp to a null value after the pusher 132 acknowledges the receipt of a client notification message associated with the object record. This operation implies that the dispatcher 138 has not received an acknowledgement from the pusher 132 for any object record having a non-null timestamp that has been in existence for a long time (e.g., 10 minutes), which indicates that the client notification message may have been lost. In response, the dispatcher 138 resends (420-19) a client notification message for each updated object to the registrar/pusher 132. Note that the operation 420-19 is essentially a repetition of the operation 420-11 for a particular object record in the object-client registration table. In some embodiments, the object update server 130 has a predefined limit for the number of re-trials for each object-client registration record. Once this limit is reached, the dispatcher 138 may remove the record from the table or apply a specific mark to the record to avoid wasting more resources on this probably abnormal scenario.

Figure 4D:
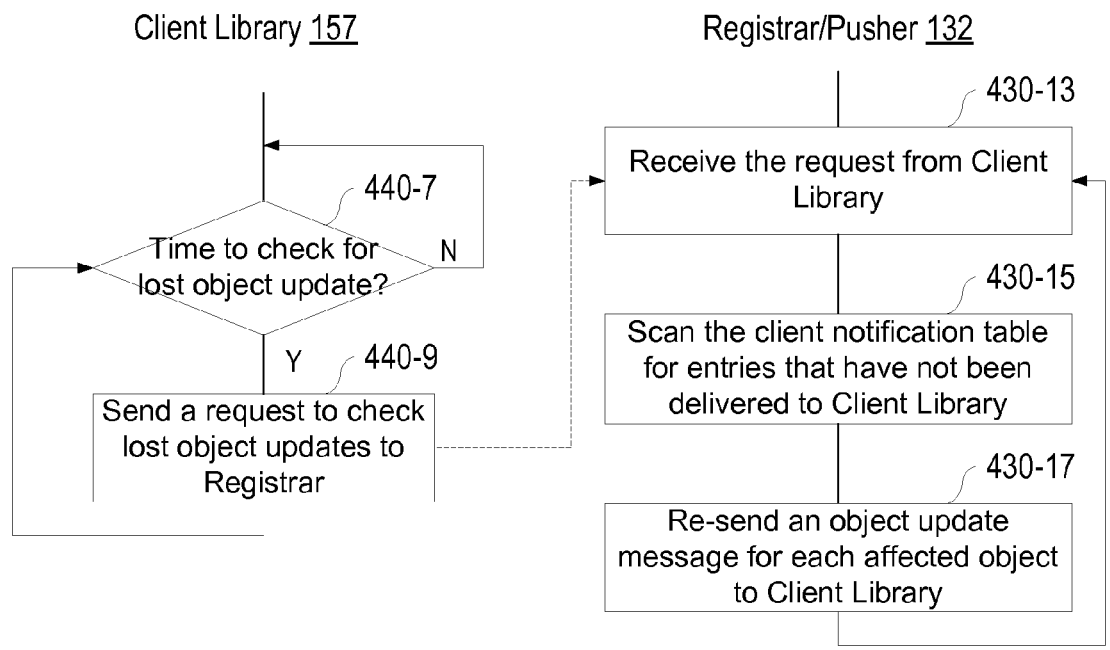

FIG. 4D depicts a message redelivery mechanism between the client library 157 and the object update pusher 132. In some embodiments, the client library 157 is the party that drives the redelivery process. When it is time (440-7) to check for lost object updates, the client library 157 sends (440-9) a request to the registrar/pusher 132. For example, the client library 157 may send a heartbeat message to the registrar/pusher 132 after every 10 minutes. Upon receipt (430-13) of the heartbeat message, the pusher 132 scans (430-15) the client notification table for records that have not been delivered to the client library 157. As explained above, records in the client notification table have a temporary life. They are generated in response to a client notification message from the dispatcher 138 and deleted after the pusher 132 receives confirmation from the respective clients (see, e.g., operation 430-9 in FIG. 4B). The fact that there is a record left in the client notification table may indicate that some of the object updates have not been delivered to a client device having the corresponding client ID. If so, the object update pusher 132 resends (430-17) an object update message to the client device at which the client library 157 resides. Note that the operation 430-17 is essentially a repetition of the operation 430-5 in FIG. 4B for a particular object. In some embodiments, there is a predefined limit for the client library 157 to request the redelivery of a particular object update message. If this predefined limit is reached, the client library 157 may deregister itself and re-register itself with the object update server 130 so as to receive from the application server 120 the latest version of an object that it fails to receive from the object update pusher 132.

Figure 5:
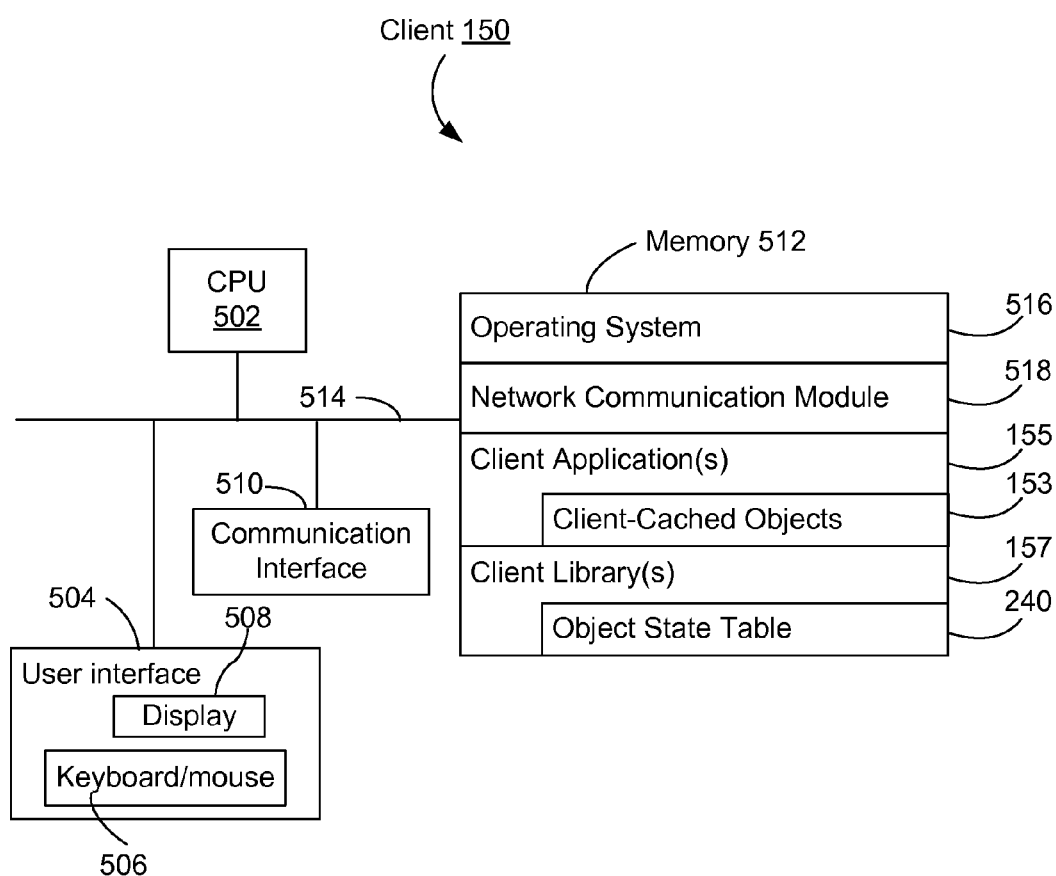
FIG. 5 is a block diagram illustrating a client device configured for registering and receiving object updates from an object update server in accordance with some embodiments.

FIG. 5 is a block diagram illustrating a client device 150 configured for registering and receiving object updates from an object update server in accordance with some embodiments. The client device 150 includes one or more processing units (CPU's) 502 for executing modules, programs and/or instructions stored in memory 512 and thereby performing processing operations; one or more network or other communications interfaces 510; memory 512; and one or more communication buses 514 for interconnecting these components. In some embodiments, the client device 150 includes a user interface 504 comprising a display device 508 and one or more input devices 506 (e.g., keyboard or mouse). In some embodiments, the memory 512 includes high-speed random access memory, such as DRAM, SRAM, DDR RAM or other random access solid state memory devices. In some embodiments, memory 512 includes non-volatile memory, such as one or more magnetic disk storage devices, optical disk storage devices, flash memory devices, or other non-volatile solid state storage devices. In some embodiments, memory 512 includes one or more storage devices remotely located from the CPU(s) 502. Memory 512, or alternately the non-volatile memory device(s) within memory 512, comprises a non-transitory computer readable storage medium. In some embodiments, memory 512 or the computer readable storage medium of memory 512 stores the following programs, modules and data structures, or a subset thereof:

an operating system 516 that includes procedures for handling various basic system services and for performing hardware dependent tasks;

a network communications module 518 that is used for connecting the client device 150 to other computers via the communication network interfaces 510 and one or more communication networks (wired or wireless), such as the Internet, other wide area networks, local area networks, metropolitan area networks, and so on;

one or more client applications 155, each client application including one or more client-cached objects 153, such as web-based electronic messaging, calendar, address book, browser bookmarks; and one or more client libraries 157, each client library including a data structure (e.g., an object state table 240) for tracking the status of the client-cached objects registered at the object update server.

Figure 6:
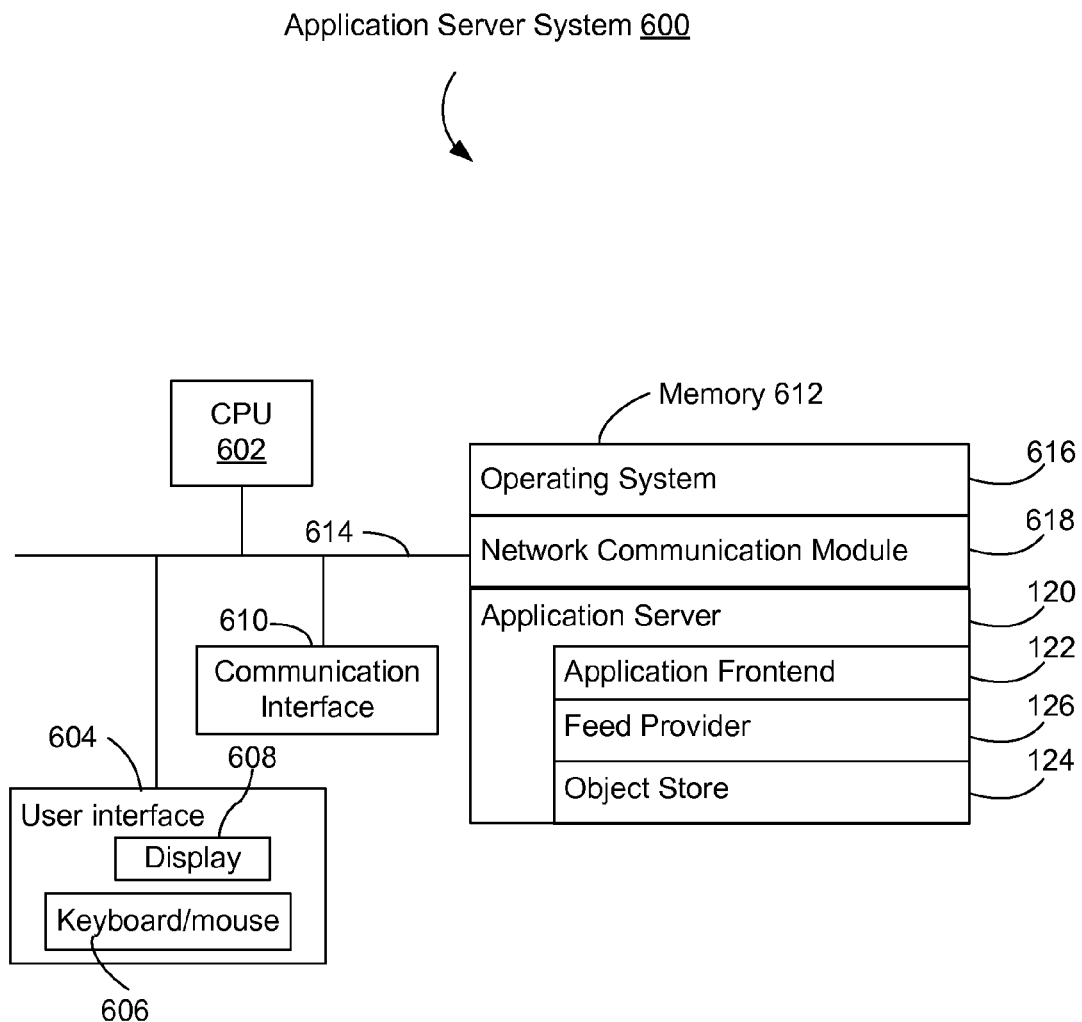
FIG. 6 is a block diagram illustrating an application server system configured for generating object updates in accordance with some embodiments.

FIG. 6 is a block diagram illustrating an application server system 600 configured for generating object updates in accordance with some embodiments. The application server system 600 includes one or more processing units (CPU's) 602 for executing modules, programs and/or instructions stored in memory 612 and thereby performing processing operations; one or more network or other communications interfaces 610; memory 612; and one or more communication buses 614 for interconnecting these components. In some embodiments, the application server system 600 includes a user interface 604 comprising a display device 608 and one or more input devices 606 (e.g., keyboard or mouse). In some embodiments, the memory 612 includes high-speed random access memory, such as DRAM, SRAM, DDR RAM or other random access solid state memory devices. In some embodiments, memory 612 includes non-volatile memory, such as one or more magnetic disk storage devices, optical disk storage devices, flash memory devices, or other non-volatile solid state storage devices. In some embodiments, memory 612 includes one or more storage devices remotely located from the CPU(s) 602. Memory 612, or alternately the non-volatile memory device(s) within memory 612, comprises a non-transitory computer readable storage medium. In some embodiments, memory 612 or the computer readable storage medium of memory 612 stores the following programs, modules and data structures, or a subset thereof:

an operating system 616 that includes procedures for handling various basic system services and for performing hardware dependent tasks;

a network communications module 618 that is used for connecting the server system 600 to other computers via the communication network interfaces 610 and one or more communication networks (wired or wireless), such as the Internet, other wide area networks, local area networks, metropolitan area networks, and so on; and one or more application servers 120, each application server including (i) an application frontend 122 for communicating with the client applications at the client devices, (ii) a feed provider 126 for sending object updates to an object update server, and (iii) an object store 124 for storing the objects used by the application server.

Figure 7:
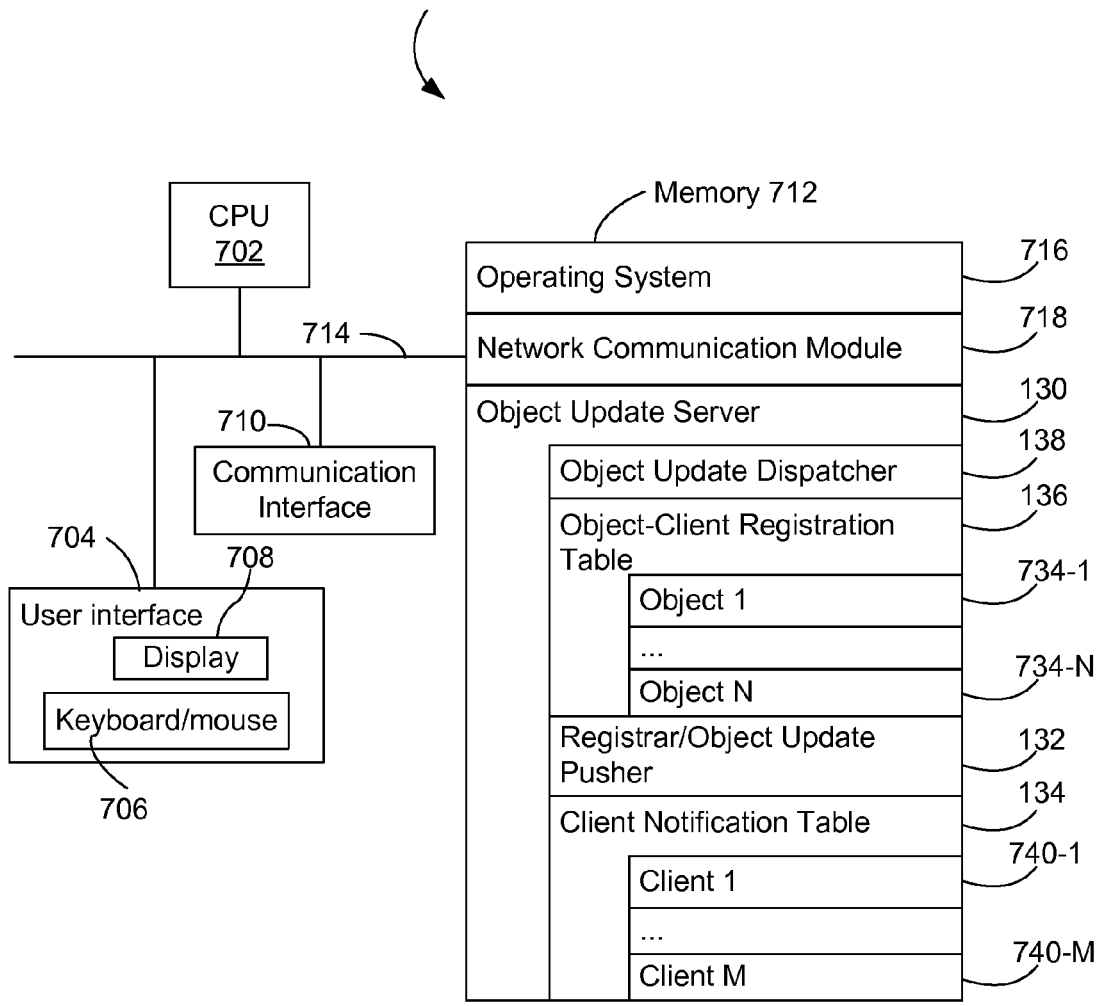
FIG. 7 is a block diagram illustrating an object update server system configured for delivering the object updates to client devices in accordance with some embodiments.

FIG. 7 is a block diagram illustrating an object update server system 700 configured for delivering the object updates to client devices in accordance with some embodiments. The server system 700 includes one or more processing units (CPU's) 702 for executing modules, programs and/or instructions stored in memory 712 and thereby performing processing operations; one or more network or other communications interfaces 710; memory 712; and one or more communication buses 714 for interconnecting these components. In some embodiments, the server system 700 includes a user interface 704 comprising a display device 708 and one or more input devices 706 (e.g., keyboard or mouse). In some embodiments, the memory 712 includes high-speed random access memory, such as DRAM, SRAM, DDR RAM or other random access solid state memory devices. In some embodiments, memory 712 includes non-volatile memory, such as one or more magnetic disk storage devices, optical disk storage devices, flash memory devices, or other non-volatile solid state storage devices. In some embodiments, memory 712 includes one or more storage devices remotely located from the CPU(s) 702. Memory 712, or alternately the non-volatile memory device(s) within memory 712, comprises a non-transitory computer readable storage medium. In some embodiments, memory 712 or the computer readable storage medium of memory 712 stores the following programs, modules and data structures, or a subset thereof:

an operating system 716 that includes procedures for handling various basic system services and for performing hardware dependent tasks;

a network communications module 718 that is used for connecting the server system 700 to other computers via the communication network interfaces 710 and one or more communication networks (wired or wireless), such as the Internet, other wide area networks, local area networks, metropolitan area networks, and so on; and an object update server 130, further including (i) an object update dispatcher 138 for receiving object updates from the feed provider of an application server and propagating these updates to the client devices, (ii) an object-client registration table 136 for storing a plurality of object-client registration records (734-1, . . . , 734-N), each record identifying an object and a set of client devices that have registered for receiving updates to the object, (iii) a registrar/object update pusher 132 for receiving object registration requests from the client devices and pushing object update messages to the client devices, and (iv) a client notification table 134 for storing a plurality of client notification records (740-1, . . . , 740-M), each record identifying a client device and a set of object updates that should be delivered to the client device.

Although some of the various drawings illustrate a number of logical stages in a particular order, stages which are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method, comprising:

at a server having memory and one or more processors, managing objects for a web-based application hosted by one or more application servers, including:

receiving an object registration message from a first client device, the object registration message including:
- a first client identifier corresponding to the first client device; and
- a first object identifier corresponding to a first object cached at the first client device, wherein the first object is used by the web-based application;

updating an object-client registration table using the first client identifier and the first object identifier, thereby registering the first client device to receive notifications of updates to the first object;

receiving a first object update message that includes the first object identifier and a first object version number, wherein the first object update message corresponds to an update to the first object at a second client device while using the web-based application;

updating the object-client registration table to specify the first object version number as a current version of the first object;
and in accordance with the registration of the first client device to receive notifications of updates to the first object, sending a second object update message to the first client device, wherein the second object update message includes the first object identifier and the first object version number;

wherein a last object update timestamp is stored when the first object update message is received, and the last object update timestamp is cleared upon receiving acknowledgement that object updates corresponding to the first object update message have been propagated, thereby assuring that the object updates are propagated even when the server has a failure.

2. The method of claim 1, wherein the object registration message includes a second object version number corresponding to the first object cached at the first client device, the method further comprising sending a third object update message to the first client device when the second object version number is less than the object's version number in the object-client registration table.

3. The method of claim 1, further comprising:
receiving an object deregistration message from the first client device, wherein the object deregistration message includes the first object identifier and the first client identifier; and
updating the object-client registration table in accordance with the object deregistration message, thereby preventing the server from sending subsequent object update messages for the first object to the first client device.

4. The method of claim 1, further comprising:
after updating the object-client registration table, sending a first object update confirmation message to the sender of the first object update message.

5. The method of claim 1, further comprising:
receiving a fourth object update message that includes the first object identifier and a third version number of the first object;
when the third version number is less than or equal to the object's version number in the object-client registration table, not updating the object-client registration table in response to the fourth object-update message; and
when the third version number is greater than the object's version number in the object-client registration table:
updating the object-client registration table to specify the third version number as the current version of the first object; and updating the stored last object update timestamp according to the fourth object update message, regardless of whether a most recently stored last object update timestamp has been cleared.

6. The method of claim 1, further comprising after updating the object-client registration table to specify the first object version number as the current version of the first object:
utilizing a client notification table to specify each of the client devices to update with the first object version of the first object, the client notification table including a separate record for each client device registered to receive updates to the first object, including a record that specifies the first client identifier and the first object identifier;
receiving a second object confirmation message from the first client device in response to sending the second object update message to the first client device; and
updating the client notification table accordingly, thereby assuring that the first client device is notified of the first object version of the first object.

7. The method of claim 1, further comprising:
when no second object update confirmation message is received from the first client device within a predefined span of time, resending the second object update message to the first client device.

8. The method of claim 1, wherein the second object update message includes a copy of the first object corresponding to the first object version number.

9. The method of claim 1, wherein the second object update message does not include a copy of the first object corresponding to the first object version number, prompting the first client device to retrieve the first object corresponding to the first object version number from the one or more application servers.

10. The method of claim 1, further comprising when no second object update confirmation message is received from the first client device within a predefined number of attempts:
updating the object-client registration table to remove references to the first client identifier, thereby preventing the server from sending any further object update messages to the first client device.

11. The method of claim 1, wherein the last object update timestamp is included in the first object update message.

12. The method of claim 1, wherein the last object update timestamp is specified according to when the first object update message is received.

13. The method of claim 1, wherein the last object update timestamp is stored in the registration table.

14. The method of claim 1, wherein the last object update timestamp is specified according to a monotonically increasing function of time.

15. The method of claim 1, further comprising:
determining based on the last object update timestamp that a predetermined amount of time has passed without receiving acknowledgement that object updates corresponding to the first object update message have been propagated; and
repropagating the updates corresponding to the first object update message.

16. A server system for managing objects for a web-based application hosted by one or more application servers, comprising:
one or more processors for executing programs; and
memory storing data and one or more programs executable by the one or more processors, the one or more programs including instructions for:

receiving an object registration message from a first client device, the object registration message including:
  a first client identifier corresponding to the first client device; and
  a first object identifier corresponding to a first object cached at the first client device, wherein the first object is used by the web-based application;
updating an object-client registration table using the first client identifier and the first object identifier, thereby registering the first client device to receive notifications of updates to the first object;
receiving a first object update message that includes the first object identifier and a first object version number, wherein the first object update message corresponds to an update to the first object at a second client device while using the web-based application;
updating the object-client registration table to specify the first object version number as a current version of the first object;
and
in accordance with the registration of the first client device to receive notifications of updates to the first object, sending a second object update message to the first client device, wherein the second object update message includes the first object identifier and the first object version number;
wherein a last object update timestamp is stored when the first object update message is received, and the last object update timestamp is cleared upon receiving acknowledgement that object updates corresponding to the first object update message have been propagated, thereby assuring that the object updates are propagated even when the server system has a failure.

17. The server system of claim 16, wherein the first object registration message includes a second object version number corresponding to the first object cached at the first client device, the one or more programs further comprising instructions for sending a third object update message to the first client device when the second object version number is less than the object's version number in the object-client registration table.

18. The server system of claim 16, wherein the one or more programs include instructions for:
  receiving an object deregistration message from the first client device, wherein the object deregistration message includes the first object identifier and the first client identifier; and
  updating the object-client registration table in accordance with the object deregistration message, thereby preventing the server from sending subsequent object update messages for the first object to the first client device.

19. The server system of claim 16, wherein the one or more programs include instructions for:
  receiving a fourth object update message that includes the first object identifier and a third version number of the first object;
  when the third version number is less than or equal to the object's version number in the object-client registration table, not updating the object-client registration table in response to the fourth object-update message; and
  when the third version number is greater than the object's version number in the object-client registration table:
    updating the object-client registration table to specify the third version number as the current version of the first object; and
    updating the stored last object update timestamp according to the fourth object update message, regardless of whether a most recently stored last object update timestamp has been cleared.

20. The server system of claim 16, wherein the one or more programs further include instructions that execute after updating the object-client registration table to specify the first object version number as the current version of the first object, the instructions for:
  utilizing a client notification table to specify each of the client devices to update with the first object version of the first object, the client notification table including a separate record for each client device registered to receive updates to the first object, including a record that specifies the first client identifier and the first object identifier;
  receiving a second object confirmation message from the first client device in response to sending the second object update message to the first client device; and
  updating the client notification table accordingly, thereby assuring that the first client device is notified of the first object version of the first object.

21. The server system of claim 20, wherein the one or more programs further include instructions for:
  when no second object update confirmation message is received from the first client device within a predefined span of time, resending the second object update message to the first client device.

22. A non-transitory computer readable-storage medium storing one or more programs for execution by one or more processors of a server system for managing objects for a web-based application hosted by one or more application servers, the one or more programs comprising instructions for:
  receiving an object registration message from a first client device, the object registration message including:
    a first client identifier corresponding to the first client device; and
    a first object identifier corresponding to a first object cached at the first client device, wherein the first object is used by the web-based application;
  updating an object-client registration table using the first client identifier and the first object identifier, thereby registering the first client device to receive notifications of updates to the first object;
  receiving a first object update message that includes the first object identifier and a first object version number, wherein the first object update message corresponds to an update to the first object at a second client device while using the web-based application;
  updating the object-client registration table to specify the first object version number as a current version of the first object;
  and
  in accordance with the registration of the first client device to receive notifications of updates to the first object, sending a second object update message to the first client device, wherein the second object update message includes the first object identifier and the first object version number;
  wherein a last object update timestamp is stored when the first object update message is received, and the last object update timestamp is cleared upon receiving acknowledgement that object updates corresponding to the first object update message have been propagated, thereby assuring that the object updates are propagated even when the server has a failure.

23. The non-transitory computer readable-storage medium of claim 22, wherein the first object registration message includes a second object version number corresponding to the first object cached at the first client device, the one or more programs further comprising instructions for sending a third object update message to the first client device when the second object version number is less than the object's version number in the object-client registration table.

24. The non-transitory computer readable-storage medium of claim 22, wherein the one or more programs include instructions for:
- receiving an object deregistration message from the first client device, wherein the object deregistration message includes the first object identifier and the first client identifier; and
- updating the object-client registration table in accordance with the object deregistration message, thereby preventing the server from sending subsequent object update messages for the first object to the first client device.

25. The non-transitory computer readable-storage medium of claim 22, wherein the one or more programs include instructions for:
- receiving a fourth object update message that includes the first object identifier and a third version number of the first object;
- when the third version number is less than or equal to the object's version number in the object-client registration table, not updating the object-client registration table in response to the fourth object-update message; and
- when the third version number is greater than the object's version number in the object-client registration table:
  - updating the object-client registration table to specify the third version number as the current version of the first object; and
  - updating the stored last object update timestamp according to the fourth object update message, regardless of whether a most recently stored last object update timestamp has been cleared.

26. The non-transitory computer readable-storage medium of claim 22, wherein the one or more programs further include instructions that execute after updating the object-client registration table to specify the first object version number as the current version of the first object, the instructions for:
- utilizing a client notification table to specify each of the client devices to update with the first object version of the first object, the client notification table including a separate record for each client device registered to receive updates to the first object, including a record that specifies the first client identifier and the first object identifier;
- receiving a second object confirmation message from the first client device in response to sending the second object update message to the first client device; and
- updating the client notification table accordingly, thereby assuring that the first client device is notified of the first object version of the first object.

27. The non-transitory computer readable-storage medium of claim 22, wherein the one or more programs further comprise instructions for:
- when no second object update confirmation message is received from the first client device within a predefined span of time, resending the second object update message to the first client device.

* * * * *